Jan. 16, 1945.   W. W. DAWSON   2,367,267
MOTOR DRIVE FOR SMALL MACHINERY
Filed Feb. 19, 1941   2 Sheets-Sheet 2
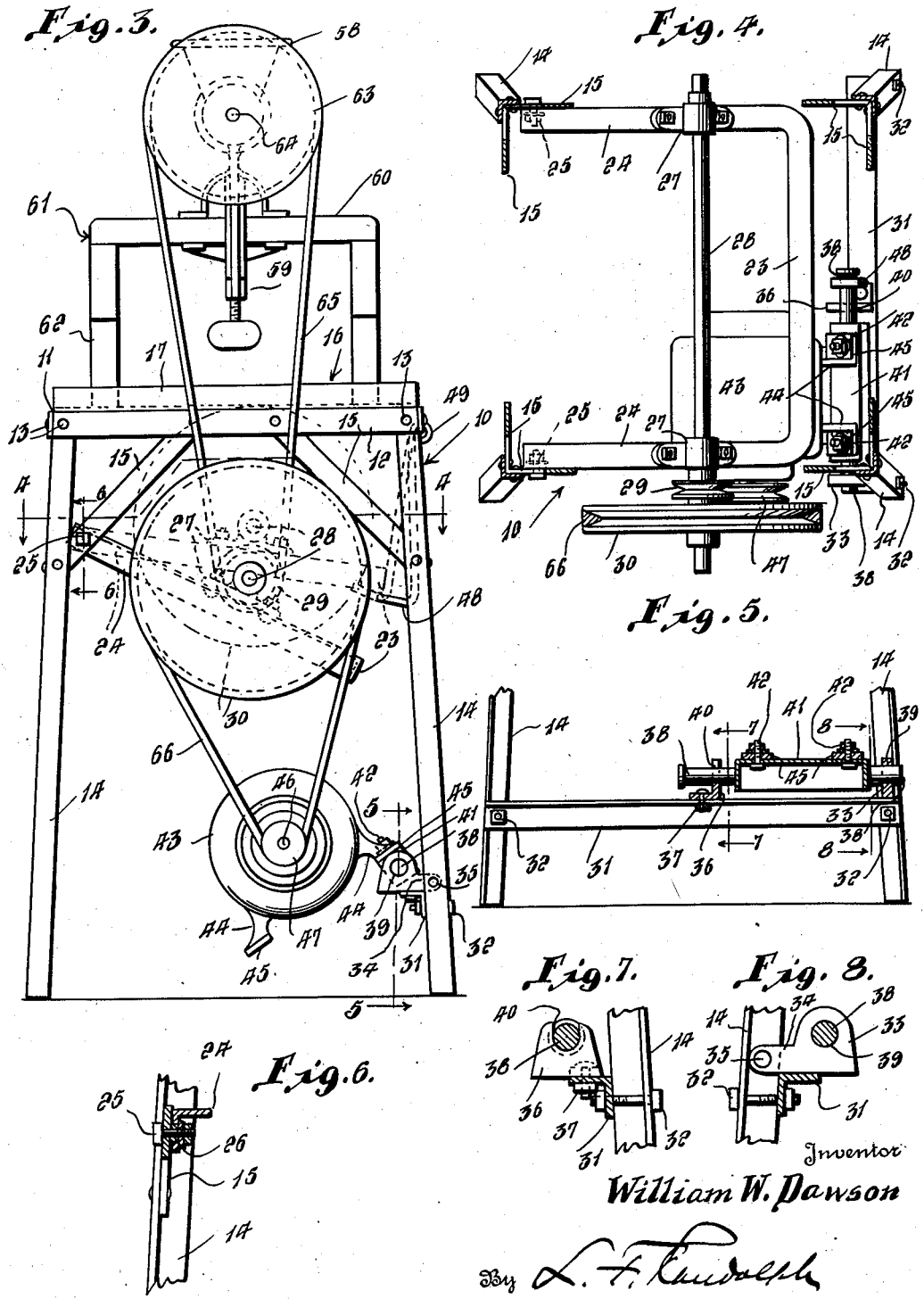
Inventor
William W. Dawson
By L. F. Kudolph
Attorney Patented Jan. 16, 1945

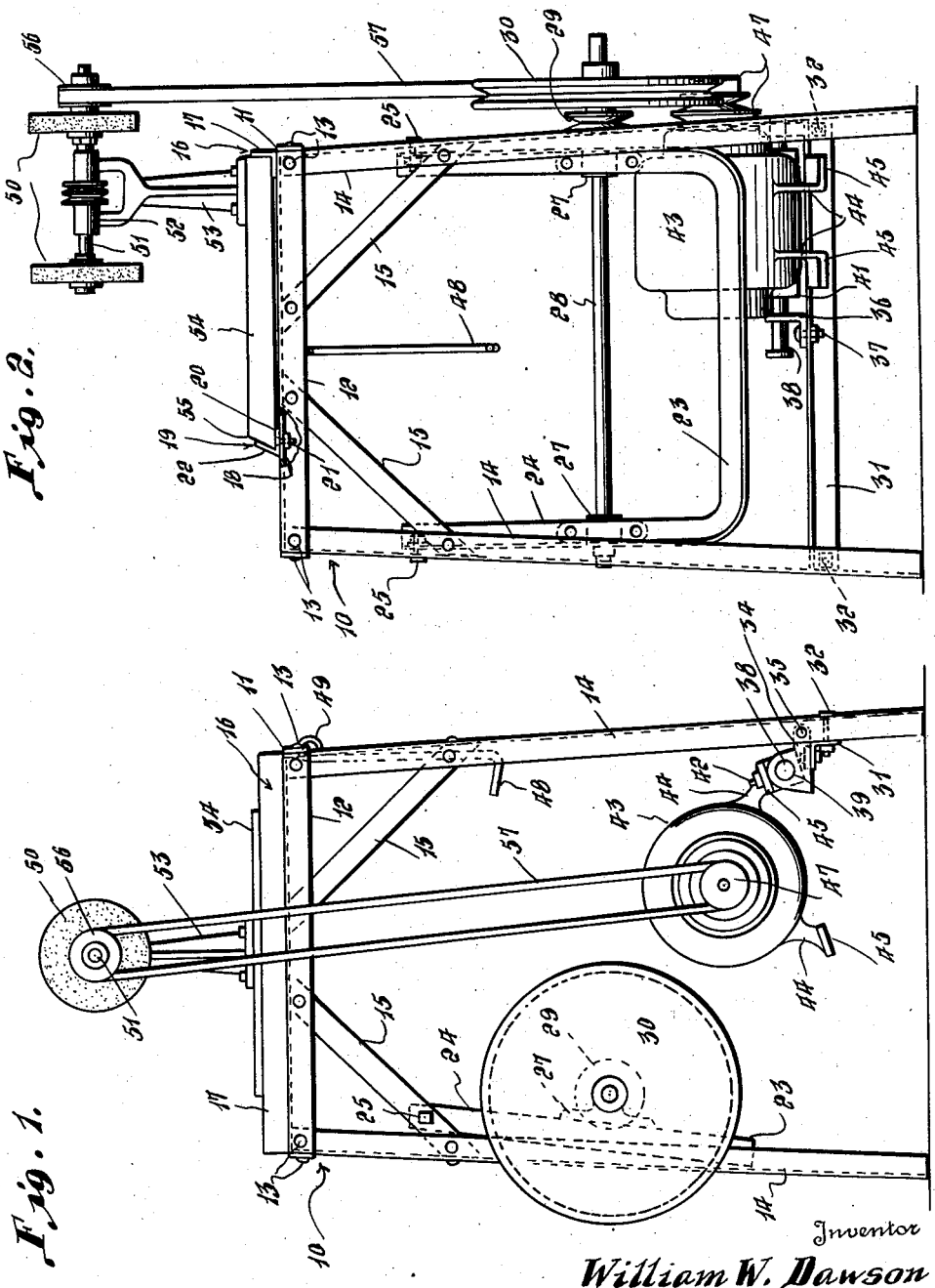

2,367,267

UNITED STATES PATENT OFFICE 2,367,267

MOTOR DRIVE FOR SMALL MACHINERY

William W. Dawson, Lost Creek, W. Va.

Application February 19, 1941, Serial No. 379,726

3 Claims. (Cl. 74—242.15)

This invention relates to a device of simple construction for supporting small domestic farm machinery and for supporting a motor and so constructed as to provide means whereby the motor may be readily attached to or detached from a piece of machinery to be driven thereby.

More particularly, it is an aim of the invention to provide a device for use in converting small domestic farm machinery such as grinding stones, meat grinders, churns and the like from hand operated machines to motor driven machines, and more particularly to machines adapted to be driven by small electric motors.

Still another aim of the invention is to provide a device on which a machine to be driven can be readily mounted or detached, having means for swingably mounting a motor therebeneath and which is adapted to be belted to the machine to be driven so that the weight of the motor will maintain a proper tension on the belt and, through the belt connection, will hold the machine to be driven securely on the device.

Still a further aim of the invention is to provide a device of the above described character having a free floating countershaft mounted between the motor and the machine to be driven and arranged to swing toward and away from said machine and motor, and which is provided with belt pulleys of different diameters to be connected by belts to pulleys of the machine and motor to provide means for reducing the driving speed so that the machine to be driven can be driven at a reduced speed relatively to the motor.

Other objects and advantages of the invention will hereinafter become more fully apparent from the following description of the drawings, which illustrate a preferred embodiment of the invention, and wherein:

Figure 1 is a front elevational view showing the device employed for driving a high speed machine such as a grinding stone, Figure 2 is a side elevational view of the same, Figure 3 is a front elevational view of the device shown arranged for driving a low speed machine such as a meat grinder, Figure 4 is a horizontal sectional view taken substantially along the plane of the line 4—4 of Figure 3, Figures 5 and 6 are vertical sectional views taken substantially along the planes of the lines 5—5 and 6—6, respectively, of Figure 3, and Figures 7 and 8 are transverse sectional views taken substantially along the planes of the lines 7—7 and 8—8, respectively, of Figure 5.

Referring more particularly to the drawings, wherein like reference characters designate like or corresponding parts throughout the different views, 10 designates generally an upright support including a top 11 which is in the form of an open rectangular frame formed of corresponding angle members 12 which are fastened together at their ends by means of fastenings 13. The frame 11 is provided with depending legs 14, likewise formed of angle members and which are connected to the ends of the angle members 12 by the fastenings 13 and which extend downwardly therefrom in diverging relationship to one another. The support 10 is provided wtih diagonally disposed braces 15, the corresponding ends of which are fastened to the members 12, intermediate of their ends, and the opposite, corresponding ends of which are fastened to the legs 14, intermediate of their ends. The braces 15, as best seen in Figure 6, are formed of elongated flat bars.

The members 12 of the support 10 are each provided with an upper horizontally disposed side. An angle member 16 is disposed on the horizontal side of the angle member 12, which is to the front of the support 10, and which is provided with an upstanding forwardly disposed side 17. The horizontally disposed sides of the members 12, which are disposed at the sides of the support 10, are provided with longitudinal slots 18, as seen in dotted lines in Figure 2. A bar 19 is disposed crosswise of the support 10 and is provided with a side 20 which rests on the horizontal sides of the side members 12. Nut and bolt fastenings 21 extend through the side 20 and through the slots 18 for connecting the member 19 thereto. It will be obvious, that when the fastenings 21 are loosened the member 19 may be moved toward and away from the member 16 and the fastenings 21 can be tightened for securing the member 19 in adjusted positions. The member 19, as best seen in Figure 2, is provided with an upwardly extending side 22 which is inclined toward the front of the support 10.

A U-shaped bearing support 23, which is preferably formed of angle iron, is pivotally connected adjacent the extremity of its legs 24 by means of the fastenings 25 to two of the braces 15, which two braces are disposed adjacent one side of the support 10 and at the front and rear thereof to thereby swingably mount the bearing support 23 on the support 10 and so that it can swing toward and away from the top of the support 10. The fastenings 25, as best seen in Figure 6, each preferably includes a nut and bolt. On the shanks of these bolts are mounted bushings 26 which are journaled thereon and on which are journaled the legs 24 of the bearing support 23. A bearing 27 is mounted on and securely fastened to each of the legs 24, remote to their free ends. The bearings 27 are disposed in alinement for receiving a countershaft 28 which is journaled therein and which has one end projecting forwardly from the support 10. Said end of the countershaft 28 is provided with a small belt pulley 29 and a substantially larger belt pulley 30 which is disposed on the outer side of the pulley 29, said pulleys being suitably keyed to the countershaft 28.

A bar 31 of angle iron is secured by fastenings 32 to a front and rear leg 14 and is disposed adjacent the lower ends of said legs 14 and at the side of the support 10, opposite to the side on which the bearing support 23 is pivotally mounted. A bearing 33 is provided with an extension 34 which is pivotally connected at 35 to the forward leg 14 of the two legs to which the bar 31 is connected, and which rests on and is supported by the horizontal side or flange of the bar 31, as best seen in Figure 8. A bearing 36 is secured to the horizontal side of the bar 31 by a fastening 37 and is disposed in spaced apart relationship to the bearing 33. A shaft 38 is journaled adjacent its ends in the bearings 33 and 36. As best seen in Figure 8, bearing 33 is provided with an opening 39 for receiving one end of the shaft 38 and the bearing 36, as best seen in Figure 7, is provided with an upwardly opening notch or recess 40 for receiving the other end of the shaft 38 so that said shaft can be readily applied to or removed from said bearings. As best seen in Figure 5, a flange 41 is suitably secured to or formed integral with the intermediate portion of the shaft 38 and projects transversely therefrom and inwardly of the support 10 and is provided adjacent its ends with nut and bolt fastenings 42. A conventional motor 43, as for example a small electric motor, is provided with supporting legs 44 having apertured feet 45. The feet of one pair of the legs 44, which are disposed at one side of the motor 43, are connected by means of their apertures engaging the fastenings 42, to the flange 41, as best seen in Figure 5, so that the motor 43 is mounted to swing vertically at a level below that of the countershaft 28. The motor 43 is provided with a driven shaft 46 having a stepped or cone pulley 47 which is of a diameter substantially less than that of the pulley 30.

A hook 48 is provided with an eyelet 49 in its shank end which is adapted to loosely engage an opening, not shown, in the depending side of the angle member 12 which is disposed at the side of the support 10 on which the motor 43 is pivotally mounted. As best seen in Figure 3, the bearing support 23 can be swung upwardly to its dotted line position and be engaged by the hook 48 in said position for supporting the bearing support 23 in substantially a horizontal position, for a purpose which will hereinafter become apparent.

Referring to Figures 1 and 2, a pair of grinding stones 50 are keyed to a shaft 51 which is journaled in a bearing 52 which forms the upper end of a post or standard 53. These parts are of conventional construction and form no part of the invention but are illustrated and described to illustrate one application thereof. A base member 54 is fastened to the under side of the base of the post or standard 53 and is disposed on top of the support 10 with one end thereof bearing against the rear face of the upstanding side 17 and its opposite end engaging against the forward, inner side of the inclined side of flange 22. Said opposite end 55, as best seen in Figure 2, is inclined to correspond to the inclination of the side 22. It will thus be seen that the grinding stones 50 are mounted by the base 54 on the support 10 in a way so that they can be readily removed by an upward movement of the forward end of the base 54 and in a manner which prevents their removal otherwise therefrom. The grinding stones 50 are intended to illustrate one type of high speed machinery which is adapted to be driven by the motor 43 and with high speed machinery a small belt pulley 56 is keyed to the forward end of the shaft 51 and is connected directly to the belt pulley 47 by a belt 57 to be driven thereby. When grinding stones or other high speed machines are operated by the motor 43 the bearing support 23 is disposed in a depending position, as illustrated in Figure 1, at one side of the support 10 and in its inoperative position. It will be obvious that the weight of the motor 43 will hold the belt 57 tensioned and will also cooperate with the parts 17 and 22 to produce a downward pull on the grinding stones to hold the base 54 securely in position on the support 10. To remove the grinding stones from the support 10, the motor 43 is swung upwardly to release the belt 57 so that it can be detached from the pulley 56 after which the base 54 is swung upwardly and rearwardly of the support 10 and thereby readily detached therefrom.

In Figures 3 and 4 the invention in shown with the parts arranged to drive a low speed machine, as for example a meat grinder 58 which is provided with a clamp 59 which is secured to a cross member 60 of a base 61 which is provided with depending sides 62 the lower ends of which are clamped between the flange 17 and the flange 22 in the same manner as the base 54. A large belt pulley 63 is keyed to the shaft 64 of the meat grinder 58. A belt 65 is disposed over the small belt pulley 29 after which with the support 23, in the position as seen in Figure 1, a belt 66 is trained over the pulleys 30 and 47. The support 23 is then swung upwardly to its dotted line position of Figure 3, engaged and held by the hook 48 while the belt 65 is trained over the pulley 63, after which the hook 48 is disengaged to permit the support 23 to assume its full line position of Figure 3. In this position, the weight of the bearing support 23 will hold the belt 65 tensioned and the weight of the motor 43 will hold the belt 66 tensioned. It will be obvious that the shaft 64 will be driven at a reduced speed to the shaft 46 due to the fact that the pulley 30 is larger than the pulley 47 and the pulley 63 is likewise larger than the pulley 29. It will also be apparent that the weight of the motor and bearing support will hold the meat grinder 58 securely in position on the support 10.

Various modifications and changes in the invention are contemplated and may obviously be resorted to as only a preferred embodiment thereof has been disclosed.

I claim as my invention:

1. In combination, a support, apparatus removably disposed thereon having an operating pulley, abutment means for the support rising from said apparatus disposed at an angle to the direction of removal of the apparatus, a drive motor pivoted to the support below the apparatus including the pulley, a drive belt means traversing said pulleys, said second pulley being suspended in the bight of the belt means for the dual purposes of operating the apparatus and holding the apparatus in contact with the abutment against accidental removal.

2. In combination, a support, apparatus removably disposed thereon having an operating pulley, abutment means for the support rising from said apparatus disposed at an angle to the direction of removal of the apparatus, a drive motor pivoted to the support below the apparatus including a pulley, a lever pivoted to the support at an elevation between said apparatus and said motor, a countershaft journaled on said lever, relatively larger and smaller pulleys on said countershaft, a belt traversing the smaller pulley and adapted to suspend the latter from said operating pulley, and a belt traversing the motor pulley and said larger pulley and suspending the motor and its pulley therefrom.

3. A device of the class described comprising a support, means for supporting and detachably mounting apparatus to be driven on the support, a motor pivoted on said support below said apparatus, a pulley on and driven by the motor, a lever pivoted to said support at an elevation between said first and second pulleys, a countershaft journaled on said lever having thereon relatively larger and smaller pulleys, said lever when unrestrained by a belt, being movable under the weight of the larger and smaller pulleys out of the zone of operation of a belt traversing the first pulley and second pulley, said support having abutment means rising thereon, said apparatus being adapted to contact and be removably positioned by said abutment means, the abutment means being at right angles to the path of removal of the apparatus, whereby the first-mentioned belt and associated parts will prevent removal of said apparatus accidentally.

WILLIAM W. DAWSON.